ized Patent [19] [11] 3,869,760
Meyer [45] Mar. 11, 1975

[54] RETAINING CLIP FORMED FROM SHEET MATERIAL
[75] Inventor: Engelbert A. Meyer, Union Lake, Mich.
[73] Assignee: USM Corporation of Flemington, New Jersey, Boston, Mass.
[22] Filed: Sept. 20, 1973
[21] Appl. No.: 399,463

[52] U.S. Cl. .................................................. 24/73
[51] Int. Cl. ............................................ A44b 21/00
[58] Field of Search ........... 24/73 B, 73, 257, 73 SC

[56] References Cited
UNITED STATES PATENTS
2,368,027  1/1945  Johnson .............................. 24/73 B
2,658,248  11/1953 Kost .................................... 24/73 B
2,984,878  5/1961  Hartman et al. ..................... 24/73 B
3,673,643  7/1972  Kindell ................................. 24/73 B
FOREIGN PATENTS OR APPLICATIONS
1,250,688  9/1967  Netherlands ........................ 24/73 B Primary Examiner—Paul R. Gilliam
Assistant Examiner—Doris L. Troutman
Attorney, Agent, or Firm—Carl E. Johnson; Vincent A. White; Richard B. Megley

[57] ABSTRACT

A structural assembly comprises a one-piece fastener for mounting on a protuberant work support, for instance, a hollow boss. The fastener is in the form of a U-shaped anchoring clip having at least one pair of opposed resilient leg portions and a bridging portion desirably formed with means for securing a workpiece thereto. The arrangement is such that free end portions of the legs may be resiliently spaced apart during assemblage of the boss and clip but upon urging their retractive separation, angular inwardly projecting tangs struck from the opposite legs, respectively, bite into the boss to grip it and hence effectively retain the parts in assembled relation. The tangs preferably are shaped to centralize the securing means with respect to the work support.

3 Claims, 5 Drawing Figures

PATENTED MAR 11 1975  3,869,760
SHEET 1 OF 2

RETAINING CLIP FORMED FROM SHEET MATERIAL

BACKGROUND OF THE INVENTION

This invention relates to a structural assembly including a clip anchorable on the protruding portion of a support and providing considerable resistance to disengagement therefrom. More particularly, the invention pertains to a "push-on" type of sheet metal fastener having integral self-retaining projections cooperative with a work support, and preferably including a screw thread engaging means for receiving a workpiece securing screw.

Numerous fasteners have been designed to be secured to structural supports and further adapted to retain a workpiece in predetermined relation to the supports. It is broadly known, of course, to employ resiliently spreadable portions of a fastener for anchoring it; also, it is old to provide a workpiece thread engaging means in the form of a hole impression. Where large quantities of fasteners are expected to be required for securing particular parts in assembled relation, it is of special concern not only that the fasteners be inexpensively made and easily installed, but that they will accommodate a range of dimensional tolerance and yet be reliable. The structural assembly of this invention is primarily intended for use in the automotive field, though not limited thereto.

SUMMARY OF THE INVENTION

In view of the foregoing, it is an object of this invention to provide a clip type fastener of simple construction for securing a workpiece in assembled relation on a protuberant work support, the fastener to be easily applied and adapted to accommodate dimensional and shape variations.

It is a further and more specific object of this invention to provide for use in a structural assembly including a round boss, an improved one-piece sheet metal clip having an interference fit therewith, the clip being of configuration to enable it to center itself on the boss during installation and be highly resistant to removal therefrom.

To these and other ends, the structural assembly of this invention comprises a work support having a protruding portion such as a boss, and a generally U-shaped clip received over the boss, the clip including a pair of resilient legs adapted to cooperatively grip the boss and having a leg-spanning portion formed with a workpiece securing means, the legs having their gripping portions formed to center the clip on the boss. The leg-spanning portion desirably is formed centrally with a thread engaging means for retention of a workpiece by a screw receivable in the boss.

BRIEF DESCRIPTION OF THE DRAWINGS

The foregoing and other features of the invention will now be more particularly described in connection with an illustrative embodiment, and with reference to the accompanying drawings thereof, in which.

DESCRIPTION OF PREFERRED EMBODIMENT

The clip of this invention is herein shown and described as employed, by way of illustration only, for securing a workpiece to an automobile arm rest. It will be understood that the invention has usage in various assemblies and in construction with widely differing types. Accordingly it will be appreciated that, although a work support is herein shown as having a round, molded plastic boss to which the clip is to be affixed for holding the workpiece to be assembled thereon, the work support may be of any protuberant configuration and of substantially rigid material. Likewise, the clip is customarily formed from sheet metal but may be of other material upon occasion dependent on the application.

Figure 4:
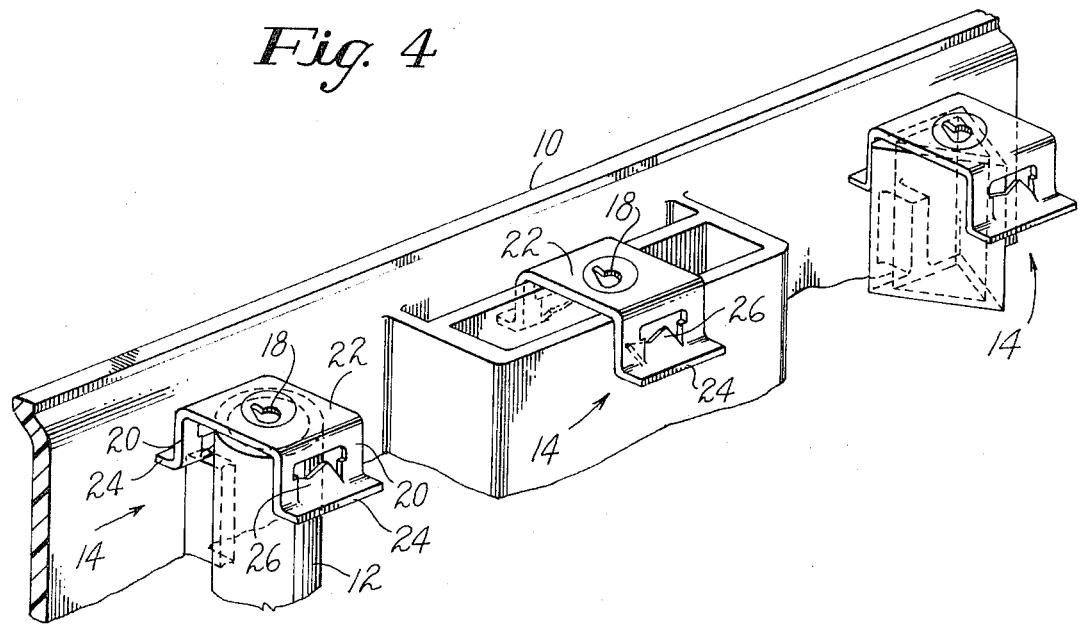
FIG. 4 is a perspective view of a work support, such as an automotive arm rest, comprising differently shaped protuberant portions, and showing the clip of FIGS. 1-3 mounted thereon in position to anchor a workpiece thereto.

Referring to FIG. 4 a work support in the form of an arm rest 10 includes one or more round or cylindrical molded bosses 12. It is desired to secure another part or workpiece (not shown) to the work support 10 in predetermined manner making use of the boss 12 for this purpose. Accordingly, a novel one-piece clip generally designated 14 and designed to be driven over the boss 12 is provided. It may incidentally be noted that the boss can be hollow as shown, but need not be provided it is adapted to receive a screw or other fastening means as will hereinafter be indicated.

The clip 14 preferably is made from an initially generally flat rectangular blank. Centrally of the blank a workpiece securing means 18, for instance a thread engaging means in the form of a circular cutout and impression, is provided as for ultimately receiving a workpiece securing screw (not shown). At least one pair of oppositely disposed portions 20,20 extend from the securing means 18 and is bent in U-shaped arrangement to provide resilient legs. Each leg portion 20 thus angularly extends from a leg-spanning portion designated 22 containing the circular means 18 and has an out-turned free end 24 for the purpose of facilitating reception over, and spreading apart by, the boss 12 or other similar protruding workpiece supports.

Figure 1:
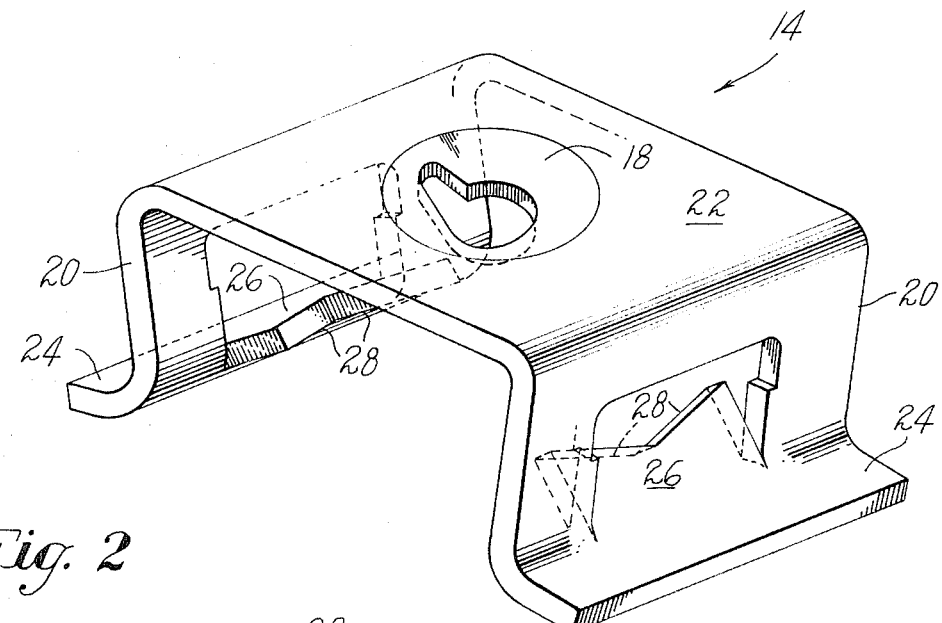
FIG. 1 is a perspective view of a preferred form of my novel retaining clip with work-gripping tangs.
Figure 2:
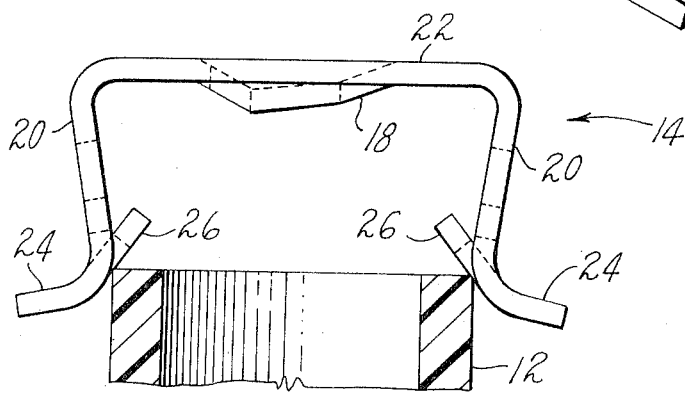
FIG. 2 is a view in side elevation of the clip of FIG. 1 in position to be received by a work support in the form of a circular hollow boss.
Figure 3:
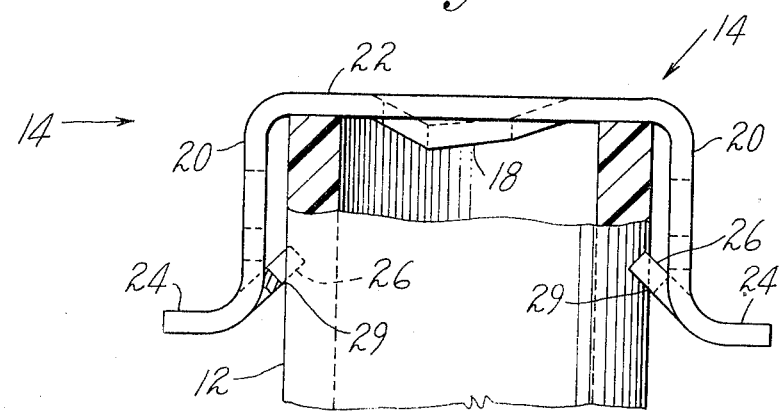
FIG. 3 is a view similar to FIG. 2, the legs of the clip now being spread apart and their tangs cooperatively gripping the boss.

At a locality spaced from its free end 24, each leg portion 20 has a blanked out gripping portion or tang 26 of a configuration adapted to engage or bite into a side wall of the work supporting boss 12. For this purpose the gripping tangs 26 desirably are of V-notch shape extending transversely of the legs 20. Apexes of the notches lie substantially in a median plane containing the axis of the cylindrical boss 12 so that straight, convergent gripping edges 28 of each notch engage the boss at points 29 (FIG. 3) to retain the clip centered on the boss. This feature is important in facilitating accurate positioning of the workpiece to be assembled as by a screw to be received in the thread engaging means 18. FIG. 2 shows the "free" or premounting position of the resilient legs 20,20 in relation to their mounted or full line positions. It will be apparent that the gripping edges 28 slidingly engage the opposite portions of the work support during its reception. By reason of the fact that the tangs 26 are respectively struck inwardly from the legs 20 and extend angularly toward the leg-spanning portion 22, attempted removal of the clip 14 from the boss 12 is effectively resisted as the tangs 26 cooperatively grip and bite into the walls of the boss. Desirably the angle of the tangs with respect to their legs is such that the center of the thread engaging impression 18 lies substantially along the line of intersection of the two planes containing the respective tangs.

Figure 5:
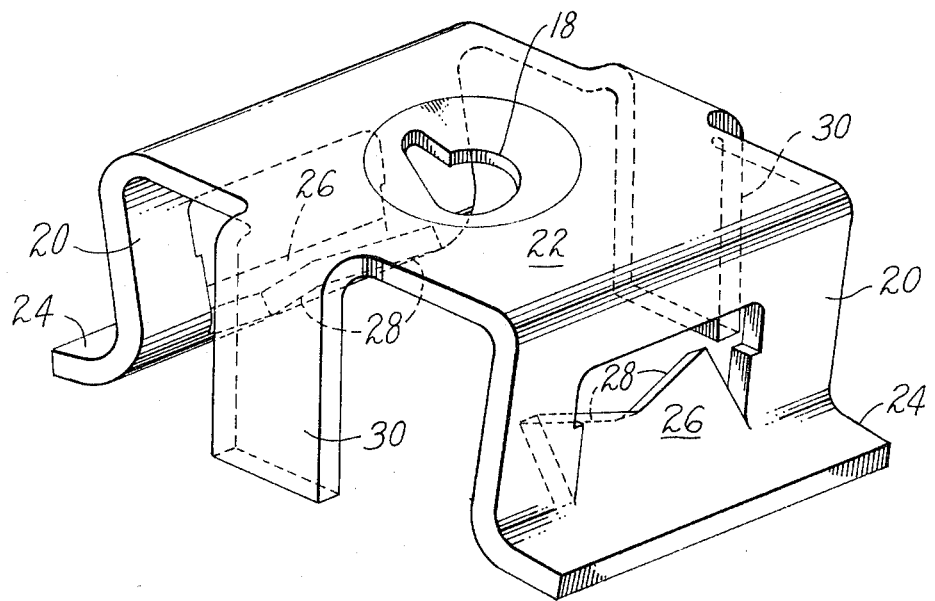
FIG. 5 is a perspective view of an alternative form of the clip wherein a pair of straight legs, without tangs, are disposed at right angles to the tanged legs to more certainly position the parts of the structural assembly.

In an alternative design (FIG. 5) otherwise operating substantially as above described, the clip 14 may including an additional pair of legs 30,30 disposed in perpendicular orientation to the legs 20,20. The legs 30 may be straight and devoid of tangs, depend in U-shaped arrangement from the original blank of sheet material, and are spaced to engage opposed protruding portions of work support 10. Thus, the legs 30 assist in centering and maintaining the clip on the boss. A clip installing tool may, if the legs 30 are not incorporated in the clip itself, be employed with projecting "legs" in like manner to insure a centered clip mounting. It may also be observed in FIG. 4 that where a boss configuration in cross section is angular instead of or in addition to, being round, one tang of a clip leg may grip a flat boss surface and the tang of a cooperating clip leg may grip a flat boss surface and the tang of a cooperating clip leg may bite into a round boss surface or even a corner portion of a boss; the clip legs need not be in 180° alignment but can, for instance, where a particular boss shape warrants, depend in triangular fashion from a leg-spanning integral portion 22. At the far right in FIG. 4, an apex of a tang 26 is shown in gripping engagement with a work support corner.

In assembling a workpiece on a work support such as the arm rest 10, a clip 14 is driven over the boss 12 and optionally over other protruding work support portions. The spaced, resilient legs 20,20 which may initially incline inwardly relative to side walls of the boss to be gripped, are accordingly spread apart as the boss is received. The tangs 26 slidably engage the boss as mounting progresses. When force is exerted for retractively dislodging the clip from the boss the tangs cooperatively grip and bite into the boss thereby effectively resisting removal. The exertion of additional removing force only causes increased embedment of the tangs in the boss. Moreover, the angularly notched gripping edges 28,28 serve to center the clip and its thread engaging means 18 on the work supporting boss. A screw or like fastener can then accurately secure the workpiece to the clip and hence to the work support 10.

From the foregoing, it will be appreciated that this invention provides a simple and economical clip for convenient push-on application to a boss to reliably secure a workpiece to a support.

Having thus described my invention, what I claim as new and desire to secure by Letters Patent of the United States is:

1. A one-piece push-on type fastener formed from sheet material for securing a workpiece in assembled relation to a protuberant work support and comprising a substantially U-shaped clip received over the work support, the clip including at least one pair of resilient legs extending from an integral leg-spanning portion, the free ends of said legs being spring biased toward each other and spreadable apart by engagement with opposed portions of the protuberant work support, said legs respectively having an intermediate portion formed with a tang struck inwardly therefrom to project toward the leg-spanning portion for cooperative gripping engagement with said opposed portions of the work support, the gripping edge of at least one of said tangs being of transversely recessed V-notch shape, and said work-spanning portion being formed with means for securing the workpiece thereto, the arrangement being such that relative withdrawal of the assembled clip and/or the workpiece from the work support urges the tangs toward a straighter toggle relationship and hence tighter gripping of the support.

2. A fastener as in claim 1 wherein each leg is of generally planar form and said tangs are correspondingly V-notched at their ends to provide straight, converging gripping edges extending transversely of the legs, the workpiece securing means is a circular thread engaging formation, and the apexes of the notched tangs are aligned with the center of said thread engaging formation.

3. A U-shaped sheet metal clip comprising a central bridging portion formed with a threaded workpiece securing means in the form of a circular cutout and impression, and a pair of opposed resilient leg portions biased toward each other, each of said leg portions having, at a locality spaced from its free end, but closer to its free end than to said bridging portion, an inwardly struck gripping tang, said tangs being planar, V-notched to provide a transverse recess at their inner ends, respectively, and inclined toward the bridging portion for cooperatively gripping a work support engaged thereby, the apexes of the V-notches being disposed inwardly of their respective leg portions to the same extent for centering the work support and enabling it to be engaged at two points on opposite sides thereof respectively whereby any attempted relative retraction of the clip and/or the workpiece secured thereto from said work support is effectively resisted by the tangs gripping more tightly said work support sides.

* * * * *